United States Patent
Funk

(10) Patent No.: US 7,817,079 B1
(45) Date of Patent: Oct. 19, 2010

(54) SYSTEM AND METHOD FOR COLLECTION OF GLOBAL AIS AND RADAR TRACK INFORMATION

(75) Inventor: Clarence John Funk, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 364 days.

(21) Appl. No.: 12/105,129

(22) Filed: Apr. 17, 2008

(51) Int. Cl.
*G01S 13/86* (2006.01)
*G01S 13/93* (2006.01)

(52) U.S. Cl. ............... 342/41; 342/43; 701/21
(58) Field of Classification Search .......... 342/41
See application file for complete search history.

(56) References Cited

U.S. PATENT DOCUMENTS

| | | | | |
|---|---|---|---|---|
| 3,772,692 | A * | 11/1973 | Braddon | 342/41 |
| 6,249,241 | B1 * | 6/2001 | Jordan et al. | 342/41 |
| 6,522,301 | B2 * | 2/2003 | Takayama et al. | 343/709 |
| 7,016,772 | B2 * | 3/2006 | Yanagi | 701/21 |
| 7,089,094 | B2 * | 8/2006 | Yanagi | 701/21 |
| 2003/0028293 | A1 * | 2/2003 | Jankowiak et al. | 701/21 |
| 2005/0209746 | A1 * | 9/2005 | Kish et al. | 701/21 |
| 2008/0086267 | A1 * | 4/2008 | Stolte et al. | 701/300 |
| 2008/0088485 | A1 * | 4/2008 | Stolte et al. | 340/991 |
| 2008/0147257 | A1 * | 6/2008 | Kuhlgatz et al. | 701/21 |
| 2008/0304597 | A1 * | 12/2008 | Peach | 375/324 |
| 2009/0271054 | A1 * | 10/2009 | Dokken | 701/21 |
| 2009/0315756 | A1 * | 12/2009 | Imazu et al. | 342/41 |

OTHER PUBLICATIONS

Kongsberg Norcontrol IT. "Warning & Integration Server WIS5060" Product data sheet. 2 pages. Nov. 16, 2006.*

* cited by examiner

*Primary Examiner*—Thomas H Tarcza
*Assistant Examiner*—Matthew M Barker
(74) *Attorney, Agent, or Firm*—Kyle Eppele; J. Eric Anderson

(57) ABSTRACT

Methods and apparatuses are described that enable the automatic collection of maritime vessel location information within a global or regional framework by using a minimum network of vessels outfitted with non-intrusive AIS data collection systems. The network of vessels may comprise standard ships operating within their normal commercial or private tasks. By utilizing these non-specially tasked vessels and augmenting the received AIS reports with onboard radar/navigation information, accurate global or regional tracking information can be generated at a centralized location without incurring large costs.

14 Claims, 5 Drawing Sheets

SYSTEM AND METHOD FOR COLLECTION OF GLOBAL AIS AND RADAR TRACK INFORMATION

FEDERALLY SPONSORED RESEARCH AND DEVELOPMENT

This invention (Navy Case No. 97,517) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice 619-553-2778; email T2@spawar.navy.mil.

BACKGROUND OF THE INVENTION

Field

This disclosure relates to the collection of information for ship tracking. More particularly, this disclosure relates to the automated collection of Automated Information System (AIS) and radar information, using a network of commercial ships, to permit the tracking of most maritime vessels.

SUMMARY

The foregoing needs are met, to a great extent, by the present disclosure, wherein methods and systems are provided that in some embodiments, a ship borne data collection system for AIS reports and Global Positioning System (GPS)/radar intercepts is configured to track ships within a region or within a global network.

In accordance with one aspect of the present disclosure, an embodiment containing a system to track a network of ships is provided, comprising: a data collection computer (DCC) on a data collection ship (DCS); an Automatic Identification System (AIS) receiver/transmitter on the DCS; a radar/GPS navigation system on the DCS; an external communications device on the DCS; and an internal communication network connecting each of the DCC, the AIS receiver/transmitter, the radar/GPS navigation system, and the external communications device, wherein information from the AIS receiver/transmitter and the radar/GPS navigation system is processed by the DCC and configured into a message format and transmitted off-ship via the external communications device.

In accordance with another aspect of the present disclosure, a method for tracking a network of ships is provided, comprising: detecting AIS information from a ship; collecting the AIS information using a DCC which is located on a DCS; collecting radar/GPS navigation information from the DCS; converting the collected information into a message format; and transmitting off-ship the collected information via a communications transmitter on the ship.

In accordance with another aspect of the present disclosure, a system to track a network of ships is provided, comprising: means for forming a network of a plurality of DCS; means for receiving, by the plurality of the DCSes, AIS reports provided by nearby ships' own-ship position information; means for receiving radar intercepts of the nearby ships by the plurality of the DCSes; means for receiving radar intercepts of nearby ships by the plurality of the DCSes; means for filtering the received AIS reports, own-ship position information, and radar intercepts to generate smoothed ship track reports; means for sampling of the smoothed ship track reports to create sampled track reports having a reduced data size; means for generating sample track messages from the sampled track reports; means for forwarding the sampled track messages to a central data processing facility (CDPF); and means for correlating the forwarded messages to provide global tracking information on the DCSes and the nearby ships.

DETAILED DESCRIPTION OF THE EMBODIMENTS

Acronyms

AIS: Automated Information System

CDPF: Central Data Processing Facility

COLREGS: Collision Regulations

DCC: Data Collection Computer

DCMS: Diplomatic Conference on Maritime Security

DCS: Data Collection Ship

DSC: Digital Selective Calling

GNSS: Global Navigation Satellite System

GPS: Global Positioning System

MMSI: Maritime Mobile Service Identity

MNIS: Multinational Information Sharing

NMI: Nautical Miles

RAIM: Receiver Autonomous Integrity Monitoring

RF: Radio Frequency

SATCOM: Satellite Communication

SOTDMA: Self-Organizing Time Division Multiple Access

TDMA: Time Division Multiple Access

TOA: Time of Arrival

UTC: Coordinated Universal Time

VHF: Very High Frequency

Figure 1:
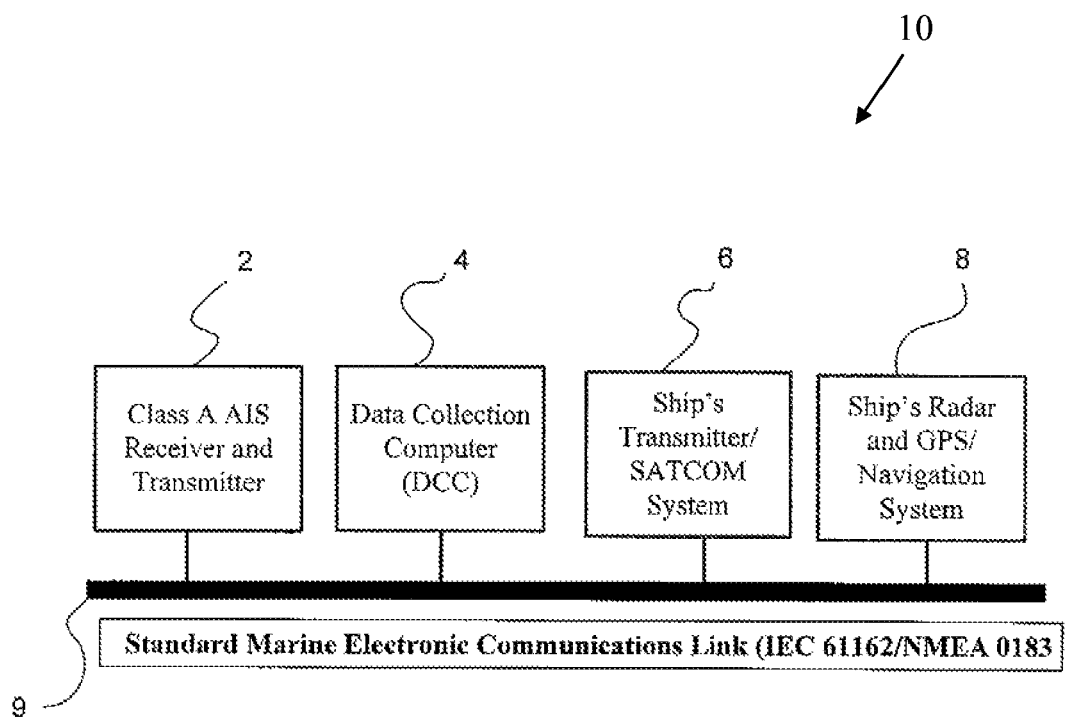
FIG. 1 is a diagram illustrating an exemplary data collection system implementation according to an embodiment of this disclosure.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details.

Automatic Identification System (AIS) is a shipboard broadcast transmitter and receiver system that sends and receives own-ship reports of ship identification, position, course, speed, and other ship-related information. In principle, the AIS system is a ship-based transponder. An amendment adopted by the Diplomatic Conference on Maritime Security (DCMS) in December 2002 stated that ships, other than passenger ships and tankers, of 300 gross tonnage and upwards but less than 50,000 gross tonnage, would be required to fit AIS not later than the first safety equipment survey after 1 Jul. 2004 or by 31 Dec. 2004, whichever occurred earlier. Consequently, as new maritime vessels become operational, the number of vessels that transmit AIS information will constantly increase.

Traditionally, "ships" are defined as maritime vessels with more than 500 tons of displacement. According to the *Lloyd's Register* of January 2005, there are 46,222 ships in the world in the following categories: General Cargo (18,150), Bulk Carriers (6,139), Container (3,165), Tankers (11,356), Passenger (5,679), and Other (1,733). Notwithstanding the 2002 DCMS amendment, there are also many maritime vessels with less than 500 tons of displacement that use AIS transponders and are also detectable by radar. The total number of theses maritime vessels is difficult to determine. A reasonable estimate for the number of maritime vessels that currently transmit AIS messages is 100,000.

AIS transmitters act like transponders, operating in the Very High Frequency (VHF) maritime band and are capable of handling well over 4,500 reports per minute and updates as often as every two seconds. The AIS systems use Self-Organizing Time Division Multiple Access (SOTDMA) technology to meet this high broadcast rate and ensure reliable ship-to-ship operation. Each AIS system contains one VHF transmitter, two VHF Time Division Multiple Access (TDMA) receivers, one VHF Digital Selective Calling (DSC) receiver, and a standard marine electronic communications link (IEC 61162/NMEA 0183) to shipboard display and sensor systems. Position and timing information is normally derived from an integral or external global navigation satellite system (e.g. GPS) receiver, including a medium frequency differential Global Navigation Satellite System (GNSS) receiver for precise position in coastal and inland waters.

Each AIS station determines its own transmission schedule (slot), based upon data link traffic history and knowledge of future actions by other stations. A position report with a duration of 26.67 milliseconds from one AIS station fits into one of 2250 time slots established every 60 seconds. AIS stations continuously synchronize themselves to each other to avoid overlap of slot transmissions. Slot selection by an AIS station is randomized within a defined interval and tagged with a random timeout of between 0 and 8 frames. When a station changes its slot assignment, it pre-announces both the new location and the timeout for that location. In this way those vessels will always receive new stations, including those stations that suddenly come within radio range close to other vessels.

A Class A AIS unit broadcasts the following information every 2 to 10 seconds while underway, and every 3 minutes while at anchor at a power level of 12.5 watts. The information broadcast includes:

Maritime Mobile Service Identity (MMSI) number—unique referenceable identification label for the transmitting ship.
Navigation status (as defined by the Collision Regulations (COLREGS)—not only are "at anchor" and "under way using engine" currently defined, but "not under command" is also currently defined).
Rate of turn—right or left, 0 to 720 degrees per minute (input from rate-of-turn indicator).
Speed over ground—1/10 knot resolution from 0 to 102 knots.
Position accuracy—differential GPS or other GPS and an indication if Receiver Autonomous Integrity Monitoring (RAIM) processing is being used.
Longitude—to 1/10000 minute and Latitude—to 1/10000 minute.
Course over ground—relative to true north to 1/10th degree.
True Heading—0 to 359 degrees derived from gyro input.
Time stamp—The universal time to nearest second that this information was generated.

In addition, the Class A AIS unit broadcasts the following information every 6 minutes:

MMSI number—same unique identification used above, links the data above to described vessel.
IMO number—unique referenceable identification (related to ship's construction).
Radio call sign—international call sign assigned to vessel, often used on voice radio.
Name—Name of ship, 20 characters are provided.
Type of ship/cargo—there is a table of possibilities that are available.
Dimensions of ship—to nearest meter.
Location on ship where reference point for position reports is located.
Type of position fixing device—various options from differential GPS to undefined.
Draught of ship—1/10 meter to 25.5 meters (note "air-draught" is not provided).
Destination—20 characters are provided (at Master's discretion).
Estimated time of arrival (TOA) at destination—month, day, hour, and minute in Coordinated Universal Time (UTC) (at Master's discretion).

The AIS system coverage range is similar to other VHF applications, essentially depending on the height of the antenna. Its propagation is slightly better than that of radar, due to the longer wavelength, so it is possible to "see" around bends and behind islands if the landmasses are not too high. If the combined heights ($h_1$ and $h_2$) of two AIS antennas, one antenna on the transmitting ship and the other antenna on the receiving ship, are 250 meters above the sea, the maximum line-of-sight range in nautical miles (NMI) between the two ships is:

$$R = \sqrt{(R_s + h_1 + h_2)^2 - R_s^2} = 30.5 \text{ NMI}, \tag{1}$$

The standard Earth radius, $$R_s = 60 \times \left(\frac{180}{\pi}\right) = 3,437.747 \text{ NMI},$$

is used in Equation 1. If two-thirds of Earth surface area between 60 degrees South and 60 degrees North is estimated to be ocean, a rough estimate of the number of data collection ships required to fully cover this area is:

$$N = \left(\frac{2}{3}\right) \left\{ \frac{4\pi R_s^2 \left(1 - 4\pi\left(1 - \cos\left(\left(\frac{\pi}{180}\right)30°\right)\right)\right)}{\pi[(R_s + h_1 + h_2)^2 - R_s^2]} \right\} = 29,406. \tag{2}$$

Since the vast majority of ships travel on well-defined shipping routes between various world-wide ports, the actual number of data collection ships required to collect comprehensive AIS data is estimated to be one tenth of the number needed to provide uniform coverage of the regions of the globe covered by water between 60 degrees South and 60 degrees North.

Assume that 3,000 data collection ships are used to collect AIS information on the fraction of the 100,000 maritime vessels with AIS transponders that were within a range of 30 NMI of any data collection ship at any instant of time. Further, assume that both the data collection ships and the maritime vessels with AIS transponders are uniformly distributed in the littoral areas and shipping lanes of world. Then, a typical data collection ship would collect AIS information data on:

$$M = {}^{100,000}/_{3,000} \approx 33 \text{ maritime vessels.} \qquad (3)$$

Although the assumption of a uniform geographic distribution of maritime vessels in the region of the earth covered by water between 60 degrees South and 60 degrees North is liberal, Equation 2 does give an indication of the magnitude of the data collection effort. For the purposes of describing the various exemplary embodiments, it is assumed that each data collection ship continuously collects AIS signals and radar signal intercepts from 100 nearby maritime vessels. The specified data processing requirements can then be easily scaled to the magnitude of the actual problem once better estimates for the magnitude of the data collection ship data collection effort are better known.

In various exemplary embodiments, it is envisioned that ships of opportunity will volunteer to participate as data collection ships as part of a commercial data collection effort. The incentive for participation could be, for example, as simple as free access to Satellite Communication (SATCOM) services for the data collection ships. The enterprise that is organizing and operating this effort could simply install the data collection hardware and software on the qualifying ships when they are at major world ports. The data collection hardware and software would be designed to operate with limited human intervention on each data collection ship.

The data collection computer (DCC) automatically controls the data collection tasks as the ship transits between various ports in the conduct of its routine operations. Since its data collection task is not permitted to impact the normal activity of the data collection ship, it is not possible to ensure a uniform distribution of data collection ships along the shipping lanes of the world. One possible solution, however, to this problem is to simply use more data collection ships than would be required if the data collection ships were uniformly distributed in maritime regions with high shipping density. This solution creates redundancy in the collected data, but this redundancy also contributes to the resolution of problems created by the failure of the DCC or other associated equipment on a data collection ship.

It should be appreciated that the cost of the exemplary hardware and software installed on each data collection ship is very small in comparison to the value of the information being collected and the cost of using alternative methods to collect this data. That is, comprehensive information by a large network of data collections ships reporting the geographically precise (location of the GPS antenna on a ship may be known with accuracy of 30 meters) and well-identified information (AIS reports provide a Multinational Information Sharing (MNIS) label for the transmitting ship). The information collected by the network of data collection ships is automatically transmitted to a central data processing facility (CDPF). The CDPF resolves the redundancy and other inconsistencies in the information reported by the network of data collection ship and generates well identified, geographically accurate, and persistent tracks for many thousands of maritime vessels that use AIS. The inclusion of radar intercept information in the data reported by the data collection ships permits the generation of geographically accurate tracks for ships that do not use AIS. The nearly continuous port-to-port tracking of many thousands of ships is understood to have very significant commercial value.

Implementations of various exemplary embodiments for the collection of accurate and well-identified information describing maritime vessels may contain two principle components: (1) Data Collection Computer(s) (DCC) on each data collection ship; and (2) a Central Data Processing Facility (CDPF).

The DCC located on each data collection ship may be configured to obtain and process automatically:

Received AIS data from other ships;

Radar intercept data provided by the radar systems on the data collection ship; and Own-ship GPS and navigation data provided by the data collection ship.

FIG. 1 is a block diagram illustrating an exemplary ship borne data collection implementation 10 within the framework described above. For example, the data collection implementation 10 contains a Class A AIS Receiver/Transmitter unit 2, the DCC unit 4, the ship's SATCOM system 6, and the ship's Radar/Navigation systems 8. All of these elements are connected in one way or another to a communication link 9 to enable communication between the various systems (2-8). Using information gathered from the various systems, the DCC unit 4 automatically generates and sends output messages that provide the collected data to the CDPF (not shown).

In FIG. 1, the communication link 9 is illustrated as the standard marine electronic communications link (IEC 61162/NMEA 0183). Of course, other types of communication links, whether IEC 61162/NMEA 0183-based or not, may be used according to design preference.

In the various exemplary embodiments of the enhanced AIS implementation 10 described herein, it is desirable for the AIS DCC unit's 4 hardware and software to be designed for robustness and high reliability, as well as having the ability to perform automatically without human intervention for many months. Further, the hardware may be designed for fault-tolerance and may, in some embodiments, have a non-interruptible power supply to minimize system down time. The software used by the DCC unit 4 may be designed to provide automatic restart and continuous operation over several months. Redundant data storage may be provided, if possible, and the software should automatically backup all input and output data processed in the previous data collection period on the redundant storage devices, if designed as such. The DCC unit 4 contains several high-level software application modules or process flows for interfacing between the systems shown in FIG. 1.

Figure 2:
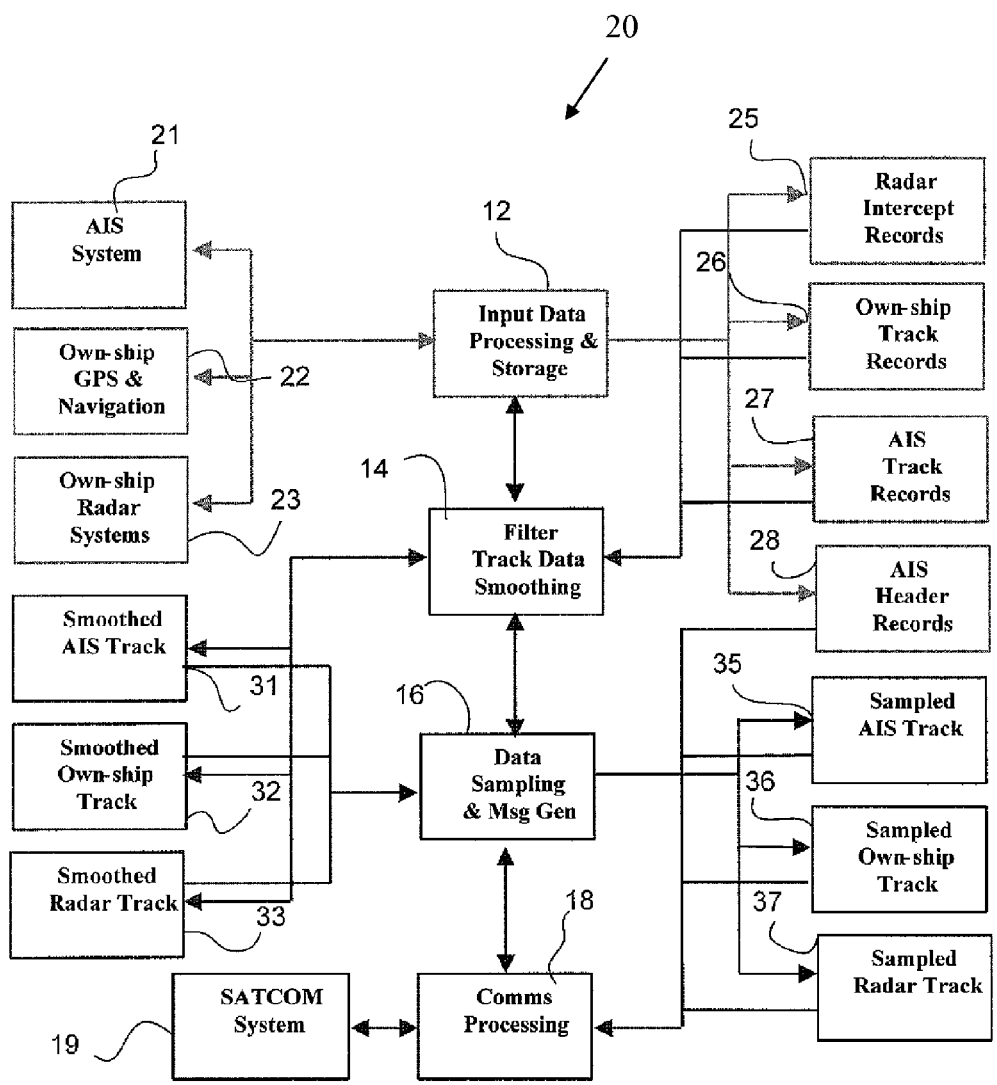
FIG. 2 is a diagram illustrating exemplary process flows between modules of the data collection system according to an embodiment of this disclosure.

FIG. 2 is a diagram illustrating the exemplary high-level process flows 20 between the processes/modules of the DCC unit 4 and other systems. Each DCC unit 4 contains at least four application processes/modules:

Input Data Processing and Storage 12;

Filter for Track Data Smoothing 14;

Data Sampling and Message Generation 16; and

Communication Processing 18.

Each of these processes/modules operates on information provided by other systems resident on the ship and information from systems resident on other ships. Based on the information gathered, tagged, consolidated, sampled, transmitted, etc., an accurate assessment of each detected ship's location and status can be generated to facilitate a near real time assessment of ship location/status information.

The exemplary process for this assessment/tracking begins with the Input Data Processing and Storage module 12 interfacing with and obtaining input data records from the data collection ship's AIS system 21, Own-ship GPS and Navigation systems 22, and Own-ship Radar systems 23. From these systems, the Input Data Processing and Storage module 12 manipulates/compiles the acquired data to generate Radar Intercept Records 25, Own-ship Track Records 26, AIS Track Records 27, and AIS Header Records 28 files. While FIG. 2 illustrates the output files (25-28) as being separate entities, it should be appreciated that fewer or more files may be used according to design preference. For example, the files may be records or classes configured within a master file or, alternatively, may be separated into more than the four files shown in FIG. 2. Thus, variations of the order and nature of the output files (25-28) may be contemplated without departing from the spirit and scope of this disclosure.

As matter of convention, the less frequently varying information about a specific ship may be stored in the AIS Track Header Records 28 file. And the frequently varying information about a specific ship may be stored in the AIS Track Records 27 file. One possible arrangement of the structures for the input AIS Track and Header Records 27-28 files is shown as the upper and lower parts, respectively, of Table 1.

TABLE 1

| Parameter | Description | ASCII Format | Units |
|---|---|---|---|
| MMSI | Maritime Mobile Service Identity | nnnnnnnn | label |
| IMO | IMO number | ? x | label |
| Call sign | Radio call sign | ? x | label |
| Name | Name | 20-x | label |
| ShipType | Type of ship | xxxx | label |
| CargoType | Type of cargo | xxxx | label |
| ShipLength | Dimensions of ship | nnnn | meters |
| AIS Loc | Location on ship | xxxx | label |
| NavType | Type of position fixing device | xxxx | label |
| Draught | Draught of ship | nn.n | meters |
| Destination | Destination | 20-x | label |
| TOA | Estimated time-of-arrival at destination | yymmdd hh:mm | Excel date |

| Parameter | Notes |
|---|---|
| MMSI | unique referenceable ship identification number |
| IMO | unique referenceable identification (related to ship's construction) |
| Call sign | international call sign assigned to vessel, often used on voice radio |
| Name | name of ship, 20 characters are provided |
| ShipType | table of possibilities that are available |
| CargoType | table of possibilities that are available |
| ShipLength | to nearest meter |
| AIS Loc | where reference point for position reports is located |
| NavType | various options from differential GPS to undefined |
| Draught | 1/10 meter to 25.5 meters [note "air-draught" is not provided] |
| Destination | 20 characters are provided (at Masters discretion) |
| TOA | month, day, hour, and minute in UTC (at Master's discretion) |

It should be appreciated that Table 1 provides one of many possible formats available to one of ordinary skill in the art in implementing data structures and their respective formats for the AIS information. Therefore, it should be understood that other formats or arrangements may be used for encapsulating the relevant information without departing from the spirit and scope of this disclosure.

For example, the upper and lower parts of Table 2 shown below illustrate one of many possible definitions of the data elements used for AIS Header Records and AIS Track Records, respectively, 27-28. The upper part of table 2 also illustrates the data fields that may be used for Own-ship Track Records 26 files.

TABLE 2

| Parameter | Description | ASCII Format | Units |
|---|---|---|---|
| MMSI | Maritime Mobile Service Identity | nnnnnnnn | label |
| DTG | Universal time of AIS data generation | yymmdd hh:mm:ss | Excel date |
| NAV-Status | Navigation status | xxxx | label |
| ROT | Rate of turn | annn | deg/min |
| Speed | Speed over ground | nnn.n | knots |
| PosAcc | Position accuracy | xxxx | label |
| Lon | Longitude | annn.nnnnnn | degrees |
| Lat | Latitude | annn.nnnnnn | degrees |
| Course | Course over ground | nnn.n | degrees |
| Heading | True Heading | nnn | degrees |

| Parameter | Notes |
|---|---|
| MMSI | unique referenceable ship identification number |
| DTG | universal time that originating ship generated information |
| NAV-Status | (as defined by the Collision Regulations (COLREGS) - not only are "at anchor" and "under way using engine" currently defined, but "not under command" is also currently defined) |
| ROT | right or left, 0 to 720 degrees per minute (input from rate-of-turn indicator) |
| Speed | 1/10 knot resolution from 0 to 102 knots |
| PosAcc | differential GPS or other and an indication if (Receiver Autonomous Integrity Monitoring RAIM processing is being used) |
| Lon | to 1/10000 minute |
| Lat | to 1/10000 minute |
| Course | relative to true north to 1/10th degree |
| Heading | 0 to 359 degrees derived from gyro input |

It should be noted that the data elements for AIS Track Records and Own-ship Track Records are principally the same because this information is generated from the GPS and navigation systems, the data stored in Own-ship Track Records originates from systems on the data collection ship, and the data stored in AIS Track Records originates from systems on other ships.

Regarding the AIS Header Record 28, it should be stored the first time a new MNIS number is provided by the AIS system on a specific data collection ship. Future AIS data is then checked to determine whether there is any information that would update the AIS Header Record 28 for a specific MNIS number. An AIS header message is sent to the CDPF whenever a new AIS header message is created or updated.

Data records in AIS Track Records 27 and Own-ship Track Records 26 files are associated with the data records in the AIS Header Records 28 by a common MMSI number. There is a one-to-many relationship between the data records stored in the AIS Header Records file 28 and the data records stored in AIS Track Records file 27. There is also a one-to-many relationship between the data records stored in the AIS Header Records file 28 and the data records stored in Own-ship Track Records files 26. The records in the Radar Intercept Record file, the AIS Track Records file 27 and the Own-ship Track Records file 26s serve as the input records for a Filter Track Data Smoothing module 14 that produces a smoothed representation of the track data for each unique target and for each source of information (radar intercept, AIS report, or own-ship position report).

The upper and lower part of Table 3 illustrate the conceptual data structure and define the conceptual data elements, respectively, for the input radar intercept records stored in the Radar Intercept Records file 25. Table 3 is presented under the assumption that the radar system on the data collection ship does not generate tracks for the detected targets. The data records in the Radar Intercept Records file 25 will provide the input information for the data filtering process that will generate smooth radar track records for each unique target detected by the own-ship radar system on a data collection ship.

TABLE 3

| Parameter | Description | ASCII Format | Units |
|---|---|---|---|
| Track # | Radar Track Number | nnnnnnnn | label |
| DTG | Universal time of radar position | yymmdd hh:mm:ss | Excel date |
| Radar | Radar Name & Model | 20-x | label |
| RF | Radar RF | nnnn.n | MHz |
| PRI-MIN | minimum value in a PRI pattern | nnnn.nn | microsec |
| Pattern | PRI Pattern Label | xxxx | label |
| Range | Target Range | nn.nnn | NMI |
| RangeErr | Target Range Error | n.nnn | NMI |
| Azmuith | Target Azimuth | nnn.n | degrees |
| AzmErr | Target Azimuth Error | nn.n | degrees |

| Parameter | Notes |
|---|---|
| Track # | aribitrary track number assigned to a set of radar reports believed to be associated with the same ship |
| DTG | Excel uses a double precision number to store the number of days from an epoch time to represent time and date information. The epoch time for PC software is 31 Dec. 1899 00:00:00. |
| Radar | standard name for radar type & model |
| RF | radio frequency |
| PRI-MIN | minimum value of a set of PRI values for a single emitter |
| Pattern | code that uniquely identifies a complex PRI pattern |
| Range | estimated radar position target range |
| RangeErr | estimated radar position target range error |
| Azmuith | relative to true north to $1/10$th degree |
| AzmErr | to $1/10$th degree |

This disclosure assumes the use of a robust target-tracking algorithm based on data filtering theory to generate smooth tracks for distinct targets from the data records provided from the operation of the Input Data Processing and Storage module 12. Specifically, information garnered by the Input Data Processing and Storage module 12 will be processed and smoothed by the Filter Track Data Smoothing module 14 to generate smoothed track records for each target. The smoothed track records are sampled by Data Sampling and Message Generation module 16 to create output message records. The output message records are then transmitted by Comms Processing module18 to the CDPF (not shown) using the SATCOM system 19. Each output message is transmitted in a well-defined message format.

One of several possible data filtering theories amenable for implementation with the exemplary embodiments described herein is Kalman filtering theory. Kalman filtering theory is instrumental in reducing the noise inherent in all sensor measurement to create smoothed target tracks automatically for each ship reporting AIS information to the data collection ship. Target-tracking software should also have the capability to automatically generate smoothed tracks from the input radar intercept and own-ship GPS/navigation data. Automatic processing of the input data is possible since there is no ambiguity in how the input target position should be associated to form unique ship tracks. Unique MNIS numbers that correspond to specific ships identify the input AIS data records and own-ship GPS/navigation records. The input radar intercept data records that would be associated to form a single radar track correspond to successive detections of the same ship and there should be no confusion on which radar intercepts correspond to a particular track since ships avoid occupying the same location at the same time to avoid collisions.

The data structure used for the Smoothed AIS Track 31 and Smoothed Own-ship Track 32 files will use, in principle, the same data fields listed in Table 2 plus the additional data fields required to store the other target state information used by the Filter Track Data Smoothing module 14. The data structure used for the Smoothed Radar Track 33 file will use the data fields listed in Table 4 (shown below) plus the additional data fields required to store the other target state information used by the Filter Track Data Smoothing module 14.

TABLE 4

| Parameter | Description | ASCII Format | Units |
|---|---|---|---|
| Track # | Radar Track Number | nnnnnnnn | label |
| DTG | Universal time of radar position | yymmdd hh:mm:ss | Excel date |
| Radar | Radar Name & Model | 20-x | label |
| RF | Radar RF | nnnn.n | MHz |
| PRI-MIN | minimum radar PRI | nnnn.nn | microsec |
| Pattern | PRI Pattern Label | xxxx | label |
| Lon | Longitude | annn.nnnnnn | degrees |
| Lat | Latitude | annn.nnnnnn | degrees |
| Course | Course over ground | nnn.n | degrees |
| Speed | Speed over ground | nnn.n | knots |
| SMA | Semi-major axis | nn.nnn | NMI |
| SMI | Semi-minor axis | nn.nnn | NMI |
| INC | Inclination | nnn.n | degrees |
| CrsErr | Course Error | nn.n | degrees |
| SpdErr | Speed Error | nn.n | knots |
| Source | DCS-MNIS | nnnnnnnn | label |

| Parameter | Notes |
|---|---|
| Track # | aribitrary track number assigned to a set of radar reports believed to be associated with the same ship |
| DTG | Excel uses a double precision number to store the number of days from an epoch time to represent time and date information. The epoch time for PC software is 31 Dec. 1899 00:00:00. |
| Radar | standard bame for radar type & model |
| RF | radio frequency |
| PRI-MIN | minimum value of a set of PRI values for a single emitter |
| Pattern | code that uniquely identifies a complex PRI pattern |
| Lon | to $1/10000$ minute |
| Lat | to $1/10000$ minute |
| Course | relative to true north to $1/10$th degree |
| Speed | $1/10$ knot resolution from 0 to 102 knots |
| SMA | semi-major axis of position 95% uncertainty ellipse |
| SMI | semi-minor axis of position 95% uncertainty ellipse |
| INC | clockwise angle between semi-major axis and true north |
| CrsErr | half angle of the two-sigma course error |
| SpdErr | two-sigma speed error |
| Source | unique referenceable ship identification number of DCS |

| Parameter | Description | ASCII Format | Units |
|---|---|---|---|
| Track # | Radar Track Number | nnnnnnnn | label |
| DTG | Universal time of radar position | yymmdd hh:mm:ss | Excel date |
| Radar | Radar Name & Model | 20-x | label |
| RF | Radar RF | nnnn.n | MHz |
| PRI-MIN | minimum radar PRI | nnnn.nn | microsec |
| Pattern | PRI Pattern Label | xxxx | label |
| Lon | Longitude | annn.nnnnnn | degrees |
| Lat | Latitude | annn.nnnnnn | degrees |
| Course | Course over ground | nnn.n | degrees |
| Speed | Speed over ground | nnn.n | knots |

TABLE 4-continued

| SMA | Semi-major axis | nn.nnn | NMI |
|---|---|---|---|
| SMI | Semi-minor axis | nn.nnn | NMI |
| INC | Inclination | nnn.n | degrees |
| CrsErr | Course Error | nn.n | degrees |
| SpdErr | Speed Error | nn.n | knots |
| Source | DCS-NMIS | nnnnnnnn | label |

Of course, it should be appreciated that data elements and data structure illustrated in Table 4 is one example of several possible data structures capable of being used with embodiments of this disclosure. Therefore, variations of the data elements and data structure illustrated in Table 4 may be implemented without departing from the spirit and scope of the exemplary embodiments described herein.

It should be noted that there should be a one-for-one relationship between the input records in the Radar Intercept Records 25, Own-ship Track Records 26, and AIS Track Records 27 files and the Smoothed Radar Track 33, Smoothed Own-ship Track 32, and Smoothed AIS Track 31 files. The data records in the smoothed track files (31-33) correspond to the state vectors for the different ships at the specified DTG values. When the Filter Track Data Smoothing module 14 receives new information for a particular track by the addition of a new input record to the Radar Intercept Records file 25, to the Own-ship Track Records file 26, or to the AIS Track Records 27 files, the track's state vector is projected to the time of the new input data record. The Filter Track Data Smoothing module 14 then combines the new input information with the projected state vector to calculate an updated state vector for the ship. The updated state vector is then stored in the corresponding Smoothed Radar Track file 33, Smoothed Own-ship Track file 32, or Smoothed AIS Track file 31.

After the filtering process 14, data sampling and output message generation 16 is performed. Information is sampled every $\Delta t_i$ seconds from the Smoothed AIS Track 31, Smoothed Own-ship Track 32, and Smoothed Radar Track 33 files and stored in the respective sampled track files 35-37 to facilitate message generation (Data Sampling and Msg Gen 16), communications processing (Comms Processing 18), and transmission to the CDPF via SATCOM 19. The "i" subscript on the time interval indicates that the data sampling interval is dependent on the behavior of a given ship track. If a specific ship is maneuvering, the sampling intervals should be much shorter than the sampling interval for a ship maintaining constant course and speed.

The value for $\Delta t_i$ could be determined for each track by the criteria that:

$$\Delta lat_i(t) = lat_i^{KF_i}(t) - lat_i^{\Delta t_i}(t) \leq error_{lat}, \quad (4)$$

$$\Delta lon_i(t) = lon_i^{KF_i}(t) - lon_i^{\Delta t_i}(t) \leq error_{lon}, \quad (5)$$

$$\Delta crs_i(t) = crs_i^{KF_i}(t) - crs_i^{\Delta t_i}(t) \leq error_{crs}, \text{ and} \quad (6)$$

$$\Delta speed_i(t) = speed_i^{KF_i}(t) - speed_i^{\Delta t_i}(t) \leq error_{speed}. \quad (7)$$

The superscript i denotes the estimate of the corresponding parameter from the filtered track for the $i^{th}$ ship and the superscript $\Delta t_i$ denotes the estimate of the corresponding parameter that can be determined by using a data-smoothing algorithm to interpolate among the sampled values during the time period $t_1 \leq t \leq t_2$. The value $t_1$ is the time of the first sample and $t_2$ is the time of the last sample for a given track. The values for the four error terms are selected to establish the quality of the track data stored in the databases used at the CDPF.

The Comms Processing module 18 is notified when new records are added to the Sampled AIS Track file 35, Sampled Own-ship Track file 36, or the Sampled Radar Track file 37. The Comms Processing module 18 is also notified whenever a new data record is added or when an existing record is updated in the AIS Header Records file 28.

The Comms Processing module 18 extracts the new information and generates a message with the extracted data in an appropriate format for transmission to the CDPF using SATCOM system(s) 19 on each data collection ship. The size of the data content in these messages is expected to be about 100 bytes when track data is being sent and may be more than 100 bytes when track header data is transmitted. However, the number of transmitted track header messages will be much smaller than the number of track data messages for the same ship. A track header message would be transmitted when AIS information for a new ship is received or when additional track header information is provided for the MNIS number. Track header messages should not be sent for new radar tracks since the radar intercepts do not provide the ship identification information provided by the received AIS data.

In various embodiments, the nominal estimate for the sampling time for the smoothed track data can be approximately five minutes. Given the constraints listed above, if the duration of an AIS track is three hours, the ratio of AIS track header to AIS track messages could be 1 to 36. If the ships are moving with an average speed of 10 knots, a rough estimate of time that a given ship will be within the 30 NMI direct-path distance of the AIS collection ship is three hours. However, if a nearby target ship maintains the same course and speed as the data collection ship, the AIS Track for this ship could last for several days.

It should be appreciated that the above values are not fixed values, as they are based on constraints imposed for demonstrative purposes, on the systems utilized herein. Therefore, based on different imposed constraints, the above numbers or values will change accordingly.

In view of the above, the number of output messages depends on the number of ships that the collection ship detects with its radar systems and receives AIS data from each day. If each data collection ship continuously collects AIS data on 100 maritime vessels, for example, as assumed in the introduction, and transmits AIS track update messages on each vessel every five minutes, for example, the number of AIS track update messages sent each day by a data collection ship to the CDPF is:

$$N_{AIS} = \frac{100 \times 24 \times 60}{5} = 28,800 \text{ reported } AIS \text{ track updates/day.}$$

Although, the radars on the data collection ship can detect maritime vessels without AIS transponders, the typical radar detection range is less than the line of sight AIS message reception range. Therefore, the number of reported radar track updates is estimated to be less than the number of reported AIS track updates. For the purposes of illustration, the number of reported radar track updates reported by each data collection ship is estimated to be one-half the number of reported AIS track updates:

$$N_{radar} = \frac{0.5 \times 100 \times 60 \times 24}{5} = 14,400 \text{ reported radar track updates/day.}$$

The number of output track header messages can be estimated to be ten times the number of reported ships since reported ships are constantly moving into or out of the estimated 30 NMI AIS detection range:

$$N_{header}=10\times100=1,000 \text{ track header messages/day.} \quad (10)$$

A computer capable of performing the necessary operations is required on each DCS to generate the estimated 44,200 output messages each day. A computer such as a Sony VAIO® VGC-RB30 desktop computer with Intel® Pentium® 4 processor 530J and 200 GB hard and Seagate Barracuda 7200.8 400 GB hard drive was found to be adequate.

If the AIS data records are received every two seconds from 100 ships, the estimated number of input AIS intercept records received per day is approximately:

$$I_{AIS} = 100 \times \frac{60\times60\times60}{2} = 4,320,000 \text{ input } AIS \text{ records/day.}$$

If radar intercepts records are estimated to be received every three seconds and the number of ship detected by radar is estimated to be one-half the number of ships providing AIS data, the number of input radar intercepts is approximately:

$$I_{radar} = \frac{100}{2} \times \frac{60\times60\times24}{3} = 1,440,000 \text{ input radar intercepts/day.}$$

Presuming a one-to-one correspondence between input records and smoothed track records, the estimated total number of input and smoothed AIS and radar track records is:

$$N_{smooth}=(4,320,00+1,440,000)=5,760,000 \text{ smoothed track records/day.} \quad (13)$$

The estimated size of a AIS track header data is 150 bytes, the estimated sizes of input AIS track and radar intercept records are 100 bytes, and the estimated size of a smoothed track record is 200 bytes. Therefore, the daily data storage requirement for these records is estimated as:

$$S_{daily-input} = \quad (14)$$
$$\frac{(150\times100)+(100\times5,760,000)+(200\times5,760,000)}{1,000,000,000} =$$
$$1.728 \text{ GB.}$$

The received AIS and radar intercept records and the corresponding smoothed track records should be retained for a period of time, for example, one month on each data collection ship. The 30-day storage estimate for this short-term data is $$S_{30day-input}=30\times S_{daily-input}=51.845 \text{ GB.} \quad (15)$$

The estimated maximum size for the sample track data is estimated to be 100 bytes. The daily storage requirement for the output records is:

$$S_{daily-input} = \frac{(28,800+14,000)\times100}{1,000,000} = 4.420 \text{ MB.} \quad (16)$$

This data may be retained for a period of time, for example, one year. The one-year storage estimate for the sampled track data is:

$$S_{365day-output} = 365 \times \frac{4.420}{1000} = 1.613 \text{ GB.} \quad (17)$$

The data storage reduction ratio of input to output data is $$R_{data-reduction} = \frac{1728}{4.42} = 391. \quad (18)$$

A possible estimate for the number of smoothed and sampled AIS track update messages that need to be processed by the CDPF in one day is:

$$N_{AIS}^{CDPF} = 100,000 \times \left(\frac{60\times24}{5}\right) - 28,800,000. \quad (19)$$

This estimation is based on the following simple assumptions:

(1) There are 100,000 maritime vessels that transmit AIS messages.

(2) There is a data collection ship that is within 30 NMI of each maritime vessel that transmits AIS data.

(3) The smoothing and sampling software on each data collection ship is able to reduce the volume of the collected AIS track data by a reduction factor, which using the constraints imposed above, is approximately 391 to one.

However, the world is seldom this simple. Some of the data collection ships will report AIS and radar track information on the same vessel. A safer estimate is to multiply the previous estimates of the number of messages sent by a typical data collection ship as described in Equations 8-10 by the estimated number of data collection ships.

$$N_{AIS}^{CDPF}=3,000\times28,800=86,400,000 \text{ input AIS track updates/day.} \quad (20)$$

$$N_{radar}^{CDPF}=3,000\times14,400=43,200,000 \text{ input radar track updates/day.} \quad (21)$$

$$N_{hdr}^{CDPF}=3,000\times1,000=3,000,000 \text{ input AIS track header updates/day.} \quad (22)$$

Each data collection ship will report an AIS track header message each time data from a different ship is collected. The analysis of consistency information of the reported AIS track header provides valuable insight into how well the MNIS numbers used by the AIS systems on different ships are coordinated to provide unique maritime vessel identification information. Even though the input AIS track header information that is sent to the CDPF may be highly redundant, all of the information may be recorded with an additional data field to report the MNIS number of the data collection ship that reported the data.

A primary role of the CDPF is to integrate the AIS and radar track data received each reporting period from the thousands of data collection ships. Because of this CDPF capability, the DCC software on each data collection ship does not need to attempt to fuse the AIS and radar track. In addition, the same AIS data may be reported by more than one data collection ship since multiple data collection ships may be within the line-of-sight range of a given maritime vessel. Also, since the data collection ships are ships presumed to be of opportunity that volunteer to participate in the data collection activity, there is no practical way to ensure that the data collection ships are uniformly distributed along the shipping lanes of the world. Therefore, the best venue for data integration is not on the individual data collection ships but at the CDPF.

The CDPF could be located in a major city where technical support and data analysts are readily available. The CDPF could also be located in a country with political stability and good infrastructure support. The actual CDPF site selected by commercial enterprise implementing the concepts described in this disclosure may be selected for a variety of economic reasons important to that enterprise. In some embodiments, multiple CDPFs could be used where each CDPF would have the responsibility to collect information from the data collection ships located in specific regions of the world, for example, the Atlantic Ocean and surrounding seas, the Pacific Ocean and adjacent seas, and the Indian Ocean and surrounding seas. The information collected, correlated, fused, analyzed for consistency, and possibly subjected to human review and action can be disseminated in near real time to paid subscribers who desire to obtain well-identified, accurate, and consistent port-to-port tracks on most ships.

Figure 3:
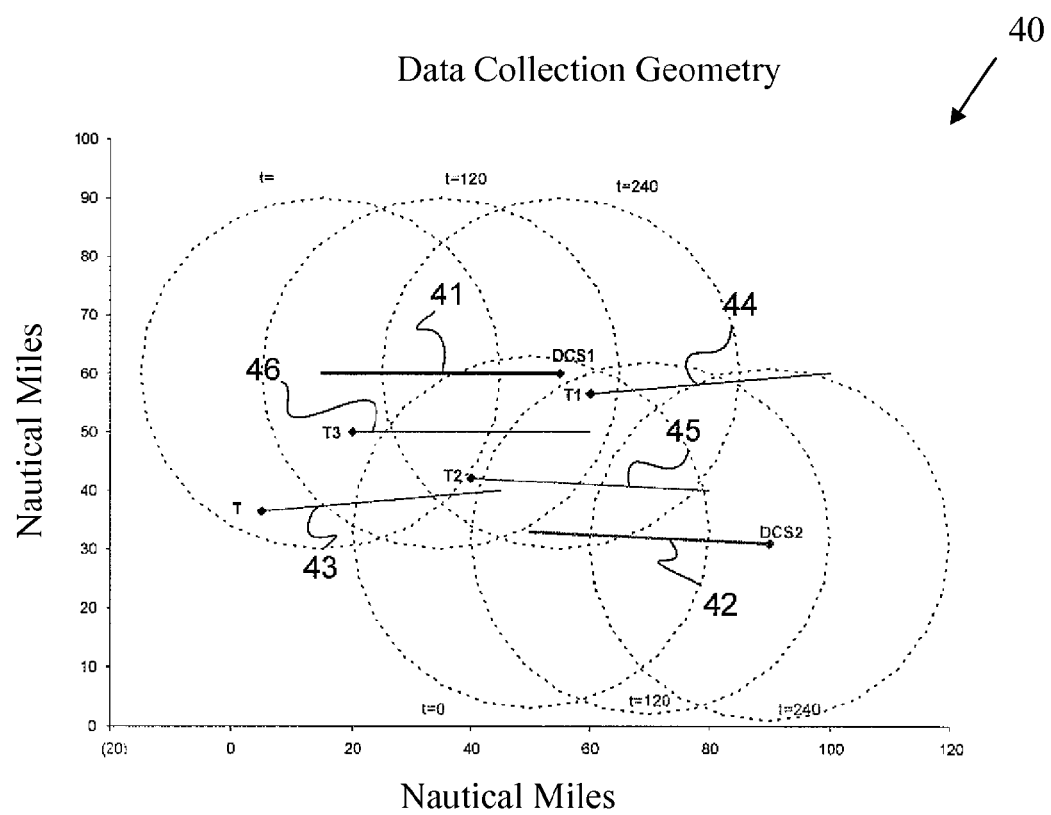
FIG. 3 is a diagram illustrating data collection geometries according to an embodiment of this disclosure.

FIG. 3 is an illustration 40 of data collection geometry considerations for a data collection ship-based tracking scenario using two data collection ships and four AIS transponder-fitted ships. The data collection ship tracks are represented as two heavy solid lines (DCS1 41 and DCS2 42) during a four-hour time period. Dotted circles illustrate arbitrary 30-nautical mile AIS detection ranges for both data collection ships at three different times: t=0, t=120, and t=240 minutes. The tracks of four other ships 43, 44, 45, 46 with AIS transponders are also shown in the illustration by the four light solid lines (T, T1, T2, and T3, respectively).

The number of tracked neighborhood ships, in this example, is reduced from one hundred per data collection ship to four to make the illustration less cluttered. The DCSes 41 and 42 are moving from the left side of the diagram to the right side, while the ships with the AIS transponders 43-46 are moving from the right side to the left side. This arrangement enhances the illustration of the integration of AIS information from the two data collection ships at the CDPF.

Figure 4:
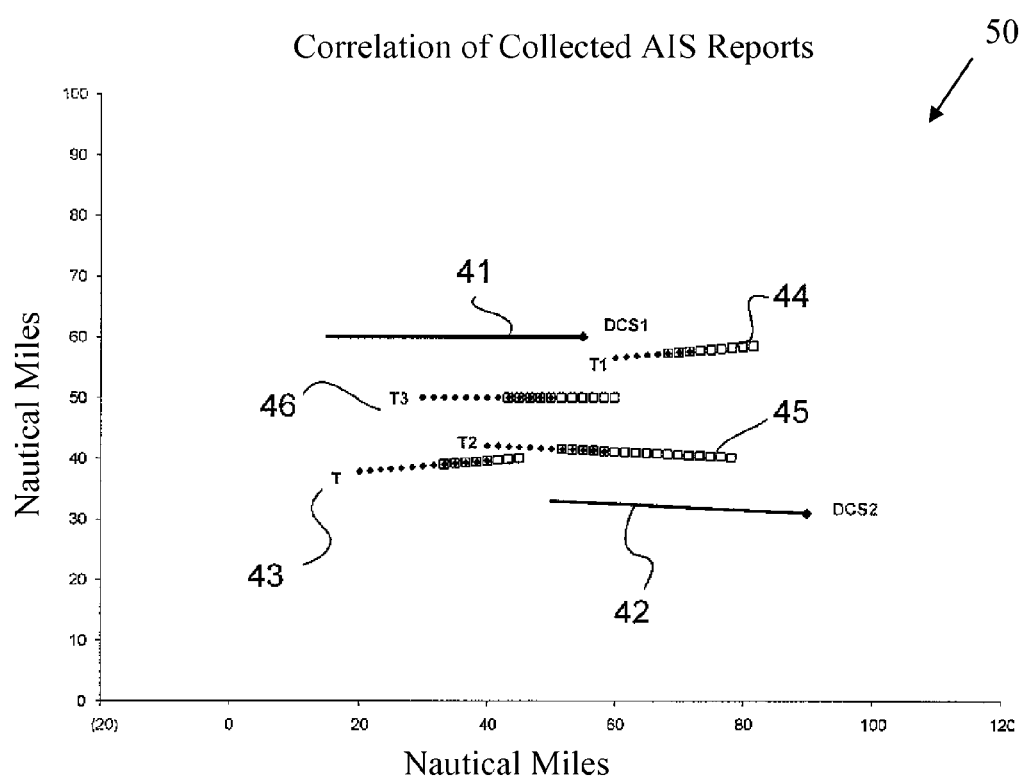
FIG. 4 is a diagram illustrating the correlation of collected AIS reports to generate ship track information according to the embodiment of FIG. 3.

The lengths of the track segments for the four AIS ships 43-46 in FIG. 3 are longer than the lengths of the corresponding track segments in FIG. 4 because the two data collection ships 41 and 42 do not provide uniform coverage of an ocean region with an area equal to 12,000 square miles. To provide uniform AIS coverage of this region, more than four data collection ships are required.

$$N = \frac{12,000}{\pi \times 30^2} = 4.244. \qquad (23)$$

However, FIG. 4 shows how the AIS track information from two data collection ships can be combined to create a single target track. The solid lines represent the AIS integrated tracks of the respective ships; and the solid diamonds represent the sampled AIS data track from data collection ship DCS1 41; and the open squares represent the sampled AIS data track from data collection ship DCS2 42. It is evident from FIG. 4, that both data collection ships detected "portions" of the ship's tracks, whereas other portions were detected by one data collection ship. By appropriate correlation of the reported AIS track data, the redundancy in the reported data can be removed. However, it should be noted that in some embodiments, all that is necessary to generate persistent port-to-port target tracks on a large majority of maritime vessels with AIS transponders is to have a "suffi-cient" number of data collection ships that are well distributed in littoral areas and along the sea-lanes of the world. Various aspects of reducing the amount of necessary data were discussed above in the context of the Data Sampling and Message Generation module 16.

Figure 5:
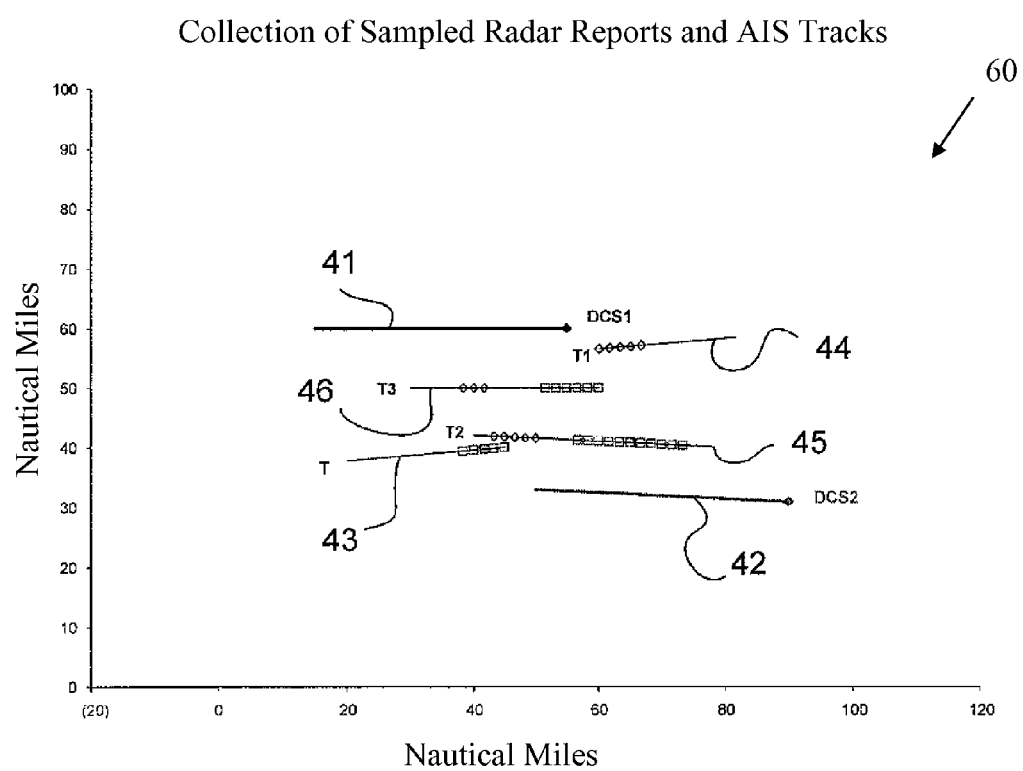
FIG. 5 is a diagram illustrating the correlation of AIS reports and radar intercepts to generate multiple source target tracks according to the embodiment shown in FIG. 3.

FIG. 5 illustrates the CDPF processing of the sampled radar reports associated with the ships of FIG. 3. FIG. 5 shows the intersection of diamonds, representing the sampled radar reports generated by data collection ship DCS1 41, and squares, representing the sampled radar intercepts collected by data collection ship DCS2 42, with the correlated AIS tracks generated by the CDPF for the four different ships 43, 44, 45, and 46. The AIS tracks are shown as light straight lines The intersections of the diamonds and squares representing the sampled radar reports with the straight lines representing the correlated AIS tracks illustrate the multiple-source fusion of the information provided by different data collection ships.

The fact that each AIS track provides a MNIS number makes it easier for the multiple-source data fusion algorithms at the CDPF to correctly associate the sampled radar reports with the correct AIS track. In addition to the consistency of the target locations over time as shown in FIG. 5, target technical characteristics data and ship models available at the CDPF permits in some embodiments the modeling of the radar cross section of the ships whose reflected radio frequency (RF) energy is used to create the sample radar report. The MNIS number provided with the AIS tracks permits the lookup of ship size, shape, construction material, and other attributes that determine the ship's radar cross section. These attributes as well as the attributes of the data collection ship's radar and the geometrical information provided by the track of the data collection ship and the AIS track of the reflecting ship permit the accurate prediction of its radar cross section as function of time. If the predicted radar cross section information is consistent with the measurements of ship cross section provided by radar reports, the consistency of both the parametric and geometric information provided by the radar reports with the attributes of the AIS tracks provides strong confirmation that the AIS and radar data can be fused to create enriched information for the four ship and confirms the correctness of the MNIS values provided by the sampled AIS reports.

The association of the sampled AIS track reports can become a problem at the CDPF when multiple ships are incorrectly using the same MNIS number. When this situation occurs, the CDPF target tracking software may generate an alert to notify CDPF operators of the problem and assign a special target track label to supplement the MNIS number being reported by one of the vessels with an AIS transponder and continue tracking both targets.

The AIS track reports from the different data collection ships are correlated at the CDPF before the sampled radar reports from the different data collection ships are compared with the correlated AIS track information. The AIS tracks shown in FIGS. 4 and 5 were generated with the assumption that the AIS data collection range is 30 nautical miles (NMI). The sample radar reports shown in FIG. 5 were generated under the assumption that the radar detection range is 20 NMI at a given instant of time. However, it should be understood that other ranges may be used according to design preference or constraint without departing from the spirit and scope of this disclosure. The information shown in FIGS. 4 and 5 represents the accumulation of sampled AIS and radar track reports over a period of four hours.

Normally, the sampled radar track reports should permit excellent geographic correlation with the AIS track data for the same target. Occasionally there may be a significant discrepancy between the two sources of information. This discrepancy should generate an alert to notify CDPF operators so that they can take action to resolve the problem. The discrepancy could be created by poor quality radar track information from a given data collection ship or by a vessel with an AIS transponder reporting erroneous target position data. If the problem is due to poor quality radar information, the same problem should exist for all of the recent radar tracks generated by this data collection ship. The reporting of erroneous target position data may be an attempt by the reporting ship to conceal its identity or location.

The CDPF is able to analyze and resolve inconsistencies in the collected AIS and radar track data to ensure the integrity and high quality of the persistent maritime tracks created for the vast majority of maritime vessels with AIS transponders.

Based on the above disclosure, many advantages can now be realized over the prior art, by implementation of the systems and methods described, without departing from the spirit and scope herein. For example, the ability to generate persistent and accurate maritime target tracks efficiently in near real time and provide port-to-port voyage information for the vast majority of maritime vessels is now possible.

Further, variations to the above systems and methods may be contemplated in some embodiments; for example, integration of the radar intercept and AIS information using the DCC hardware and software on each data collection ship rather than deferring the integration of multi-source target track information at the CDPF may be considered as a viable alternative. Theory indicates that multi-source data integration is most effective when the data integration algorithms use measurement level data, and the measurement level data is only available on the data collection ships under the currently described paradigm.

A reason for deferring the integration of the AIS track update and radar track update information to the CDPF is that the personnel on the data collection ship may not be equipped to handle the alerts generated by this process. However, instances or designs may occur where this issue may become insignificant; and integration may be desired at the data collection ship level.

It should be appreciated that data sampling significantly reduces the SATCOM bandwidth needed to transmit the collected AIS and radar track data. As disclosed herein, a factor of 391 to 1 may be achieved. Of course, lower or higher reduction factors may be achieved, depending on the sampling algorithms utilized and the behavior of the ships whose location and activity is being reported.

It will be understood that many additional changes in the details, materials, steps and arrangement of parts, which have been herein described and illustrated to explain the nature of the disclosure, may be made by those skilled in the art within the principal and scope of the disclosure as expressed in the appended claims.

What is claimed is:

1. A method for tracking a network of ships, comprising:
    forming a network of a plurality of data collection ships (DCS);
    receiving, from the plurality of the DCSes, Automatic Information System (AIS) reports provided by nearby ships' own-ship position information;
    receiving radar intercepts of the nearby ships by the plurality of the DCSes;
    filtering the received AIS reports, own-ship position information, and radar intercepts to generate smoothed ship track reports;
    sampling of the smoothed ship track reports to create sampled track reports having a reduced data size;
    generating sample track messages from the sampled track reports;
    forwarding the sampled track messages to a central data processing facility (CDPF); and
    correlating the forwarded messages to provide global tracking information on the DCSes and the nearby ships.

2. The method according to claim 1, wherein the receiving radar intercepts includes at least one of an automatic generation of radar intercept records on nearby ships, an automatic generation of own-ship track records, and an automatic generation of AIS track records and AIS header records from the received AIS reports.

3. The method according to claim 1, wherein the filtering is performed with a Kalman filter scheme.

4. The method according to claim 1, wherein the forwarding the sampled track messages is performed using a SATCOM system.

5. The method of claim 1, wherein the step of sampling step further comprises sampling the smoothed ship track reports at a data sampling interval $\Delta t_i$ where the subscript i indicates that the data sampling interval is dependent on the behavior of a given ship track such that if a specific ship is maneuvering, the sampling intervals are shorter than the sampling interval for a different ship maintaining constant course and speed.

6. The method of claim 5 wherein the value of the data sampling interval $\Delta t_i$, determined for each track by the criteria that:

$$\Delta lat_i(t) = lat_i^{KFi}(t) - lat_i^{\Delta t_i}(t) \leq error_{lat},$$

$$\Delta lon_i(t) = lon_i^{KFi}(t) - lon_i^{\Delta t_i}(t) \leq error_{lon},$$

$$\Delta crs_i(t) = crs_i^{KFi}(t) - crs_i^{\Delta t_i}(t) \leq error_{crs}, \text{ and}$$

$$\Delta speed_i(t) = speed_i^{KFi}(t) - speed_i^{\Delta t_i}(t) \leq error_{speed}$$

where $\Delta lat_i$, is the change in latitude of the specific ship, $\Delta lon_i$ is the change in longitude of the specific ship, $\Delta crs_i$ is the change in course of the specific ship, and $\Delta speed_i$ is the change in speed of the specific ship.

7. The method of claim 6 wherein:
    the subscript i denotes the estimate of the corresponding parameter from the filtered track for the $i^{th}$ ship and the superscript $\Delta t_i$ denotes the estimate of the corresponding parameter that can be determined by using a data-smoothing algorithm to interpolate among the sampled values during the time period $t_1 \leq t \leq t_2$, where the value $t_1$ is the time of the first sample and $t_2$ is the time of the last sample for a given track; and
    wherein the values for the four error terms, $error_{lat}$, $error_{lon}$, $error_{crs}$, and $error_{speed}$ are selected to establish the quality of the track data stored in the databases used at the CDPF.

8. The method of claim 1 further comprising the step of reporting an AIS track header message by each DCS each time data from a different ship is collected.

9. A system to track a network of ships, comprising:
    means for forming a network of a plurality of data collection ships (DCS);
    means for receiving, by the plurality of the DCSes, Automatic Information System (AIS) reports provided by nearby ships' own-ship position information;
    means for receiving radar intercepts and corresponding GPS data from the nearby ships by the plurality of the DCSes;
    means for filtering the received AIS reports, own-ship position information, and radar intercepts to generate smoothed ship track reports;

means for sampling of the smoothed ship track reports to create sampled track reports having a reduced data size;

means for generating sample track messages from the sampled track reports;

means for forwarding the sampled track messages to a central data processing facility (CDPF); and means for correlating the forwarded messages to provide global tracking information on the DCSes and the nearby ships.

10. The system according to claim 9, wherein the means for forwarding is a SATCOM system.

11. The system according to claim 9, wherein the means for filtering is a Kalman filtering scheme.

12. The system according to claim 9 wherein the means for means for sampling of the smoothed ship track reports samples the smoothed ship track reports at a data sampling interval $\Delta t_i$, where the subscript i indicates that the data sampling interval is dependent on the behavior of a given ship track such that if a specific ship is maneuvering, the sampling intervals are shorter than the sampling interval for a different ship maintaining constant course and speed.

13. The system of claim 12 wherein the value of the data sampling interval $\Delta t_i$, determined for each track by the criteria that:

$$\Delta lat_i(t) = lat_i^{KFi}(t) - lat_i^{\Delta ti}(t) \leq error_{lat},$$

$$\Delta lon_i(t) = lon_i^{KFi}(t) - lon_i^{\Delta ti}(t) \leq error_{lon},$$

$$\Delta crs_i(t) = crs_i^{KFi}(t) - crs_i^{\Delta ti}(t) \leq error_{crs}, \text{ and}$$

$$\Delta speed_i(t) = speed_i^{KFi}(t) - speed_i^{\Delta ti}(t) \leq error_{speed}$$

where $\Delta lat_i$ is the change in latitude of the specific ship, $\Delta lon_i$ is the change in longitude of the specific ship, $\Delta crs_i$ is the change in course of the specific ship, and $\Delta speed_i$ is the change in speed of the specific ship.

14. The system of claim 13 wherein:

the subscript i denotes the estimate of the corresponding parameter from the filtered track for the $i^{th}$ ship and the superscript $\Delta t_i$ denotes the estimate of the corresponding parameter that can be determined by using a data-smoothing algorithm to interpolate among the sampled values during the time period $t_1 \leq t \leq t_2$, where the value $t_1$ is the time of the first sample and $t_2$ is the time of the last sample for a given track; and wherein the values for the four error terms, $error_{lat}$, $error_{lon}$, $error_{crs}$, and $error_{speed}$ are selected to establish the quality of the track data stored in the databases used at the CDPF.

* * * * *